(12) United States Patent
Powell

(10) Patent No.: US 6,592,133 B2  
(45) Date of Patent: Jul. 15, 2003

(54) REMOVABLY ATTACHABLE WHEEL ASSEMBLY FOR ARTICLE TRANSPORTING CONTAINERS

(76) Inventor: Zelma D. Powell, 20535 Archdale, Detroit, MI (US) 48235

( * ) Notice: Subject to any disclaimer, the term of this patent is extended or adjusted under 35 U.S.C. 154(b) by 0 days.

(21) Appl. No.: 09/727,636

(22) Filed: Dec. 1, 2000

(65) Prior Publication Data

US 2002/0067013 A1 Jun. 6, 2002

(51) Int. Cl.[7] .............................................. B60B 33/00
(52) U.S. Cl. ..................... 280/79.11; 280/37; 16/30; 16/406; 16/428
(58) Field of Search ........................... 16/30, 406, 407, 16/114.1, 426, 428, 422; 280/79.11, 37

(56) References Cited

U.S. PATENT DOCUMENTS

| | | | | |
|---|---|---|---|---|
| 2,733,065 A | * | 1/1956 | Barkschat | 280/7.13 |
| 2,745,117 A | * | 5/1956 | Sands | 16/30 |
| 3,537,721 A | * | 11/1970 | Warner, Jr. | |
| 3,653,474 A | * | 4/1972 | Sadow | 190/18 A |
| 3,879,798 A | * | 4/1975 | Krulwich | 16/30 |
| 3,935,613 A | * | 2/1976 | Kaneko | 16/30 |
| 4,036,336 A | | 7/1977 | Burtley | |
| 4,217,675 A | | 8/1980 | Haft | |
| 4,422,212 A | * | 12/1983 | Sheiman et al. | 16/29 |
| D280,783 S | | 10/1985 | Bomes et al. | |
| 4,596,397 A | * | 6/1986 | Conti | 280/79.11 |
| 4,689,860 A | * | 9/1987 | Suchowski | 24/239 |
| 4,756,394 A | * | 7/1988 | Cohen | 190/18 A |
| 4,773,123 A | | 9/1988 | Yu | |
| 4,900,043 A | | 2/1990 | Kho | |
| 4,915,402 A | | 4/1990 | Brinker | |
| 5,136,751 A | * | 8/1992 | Coyne et al. | 16/30 |
| 5,351,792 A | * | 10/1994 | Cohen | 190/18 A |
| 5,498,010 A | | 3/1996 | Stube | |
| D374,773 S | | 10/1996 | Domotor | |
| 5,634,240 A | * | 6/1997 | Brokaw | 16/30 |
| D395,164 S | | 6/1998 | Langmuir et al. | |

* cited by examiner

*Primary Examiner*—Avraham Lerner  
(74) *Attorney, Agent, or Firm*—John D. Gugliotta

(57) ABSTRACT

A removably attachable wheel assembly for article transporting containers is provided for transporting containers such as luggage and other objects not originally equipped with rolling wheels with a rolling means for easier travel. Plastic bases mount to the luggage with the aid of adhesive foam tape or glue. Additionally, a pull strap is connected to the luggage with the aid of an eye hook which is also attached with adhesive foam tape or glue. The rolling wheels are then snapped to the plastic bases and are maintained thereto until positively released. Various size wheels to suit the load encountered can be snapped onto the same base. If the wheels and the strap are no longer needed, they may be easily removed from the base and stored until needed again. The wheel bases and the eye hook would permanently remain with the luggage or other object.

10 Claims, 6 Drawing Sheets

REMOVABLY ATTACHABLE WHEEL ASSEMBLY FOR ARTICLE TRANSPORTING CONTAINERS

RELATED APPLICATIONS

The present invention was first described in Disclosure Document No. 475,354 filed on Jun. 9, 2000. There are no previously filed, nor currently any co-pending applications, anywhere in the world.

BACKGROUND OF THE INVENTION

1. Field of the Invention

The present invention relates generally to portable article transporting containers and, more particularly, to a removably attachable wheel assembly for article transporting containers.

2. Description of the Related Art

The addition of wheels and a pull handle to luggage by manufacturers has been a fairly recent one. Now it is common to go to an airport and see hundreds of people pulling their belongings behind them in simple and effortless manner. Such use not only saves one's back, arms, and hands from overexertion, they also allow those such as the elderly, disabled, or children to transport some, if not all of their belongings as well. Those travelers without wheels on their luggage are forced to discard their current luggage and buy new luggage to pick up this worthwhile feature. This is extremely unfortunate because most people's luggage is in fairly good physical shape and to discard it would be a waste of good money.

Accordingly, there exists a need for a means by which the functionality of rolling wheels can be added to luggage and similar items not so equipped. The development of the removably attachable wheel assembly for article transporting containers fulfills this need.

A search of the prior art did not disclose any patents that read directly on the claims of the instant invention; however, the following references were considered related. The following patents disclose a retractable wheel assembly for luggage: U.S. Pat. No. 4,915,402 issued in the name of Brinker; U.S. Pat. No. 4,773,123 issued in the name of Yu; and U.S. Pat. No. 4,217,675 issued in the name of Haft.

The following patents describe the ornamental design for a wheeled luggage case: U.S. Pat. No. D 395,164 issued in the name of Langmuir et al.; U.S. Pat. No. D 374,773 issued in the name of Domotor; and U.S. Pat. No. D 280,783 issued in the name of Bomes et al.

U.S. Pat. No. 5,498,010 issued in the name of Stube discloses an edge bumper guard and roller wheel assembly for a suitcase.

U.S. Pat. No. 4,900,043 issued in the name of Kho describes wheel holding brackets attached to suitcases.

U.S. Pat. No. 4,036,336 issued in the name of Burtley discloses a wheeled suitcase convertible to a luggage cart.

Consequently, a need has been felt for providing a device which provides luggage and other objects not originally equipped with rolling wheels the luxury of such a benefit in a manner which is quick, easy and effective.

SUMMARY OF THE INVENTION

Therefore, it is an object of the present invention to provide removably attachable wheel assemblies which provide convenience of rolling wheels to luggage not so equipped.

It is another object of the present invention to provide removably attachable wheel assemblies which reduce effort in transporting luggage.

It is still another object of the present invention to provide removably attachable wheel assemblies which save the cost of new luggage.

It is still another object of the present invention to provide removably attachable wheel assemblies which are great for heavy loads that need to be carried long distances.

It is another object of the present invention to provide an attachment base which attaches to luggage with adhesive foam tape or glue.

It is another object of the present invention to provide an attachment base which allows wheels to snap on an off.

It is another object of the present invention to provide an attachment base which easily attaches and keeps functionality of luggage without wheels.

It is another object of the present invention to provide wheels which are available in multiple sizes to fit all types of loads or terrain.

It is another object of the present invention to provide various sized wheels which can be snapped onto the same attachment base.

It is another object of the present invention to provide a pulling strap which allows luggage to be pulled like a wagon.

It is another object of the present invention to provide a pulling strap which easily clips off when not in use.

It is another object of the present invention to provide a removably attachable wheel assembly for older luggage without wheels.

It is another object of the present invention to provide a removably attachable wheel assembly for article transporting containers which can be used on any similar sized objects thus being ideal for travelers.

It is another object of the present invention to provide a removably attachable wheel assembly for article transporting containers which is ideal for the elderly or physically disabled.

Briefly described according to one embodiment of the present invention, a removably attachable wheel assembly for article transporting containers is disclosed for providing article transporting containers such as luggage and other objects not originally equipped with rolling wheels with a rolling means for easier travel. The invention is primarily intended to add the function of rolling wheels to luggage not originally equipped with them, though the invention may be used on any similar sized object that is transported frequently. The invention comprises plastic bases which mount to the luggage with the aid of adhesive foam tape or glue. Additionally, a pull strap is connected to the luggage with the aid of an eye hook which is also attached with adhesive foam tape or glue. The rolling wheels are then snapped to the plastic bases and are maintained thereto until positively released. Various size wheels to suit the load encountered can be snapped onto the same base. If the wheels and the strap are no longer needed, they may be easily removed from the base and stored until needed again. The wheel bases and the eye hook would permanently remain with the luggage or other object.

The use of the present invention provides luggage and other objects not originally equipped with rolling wheels the luxury of such a benefit in a manner which is quick, easy and effective.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Figure 1:
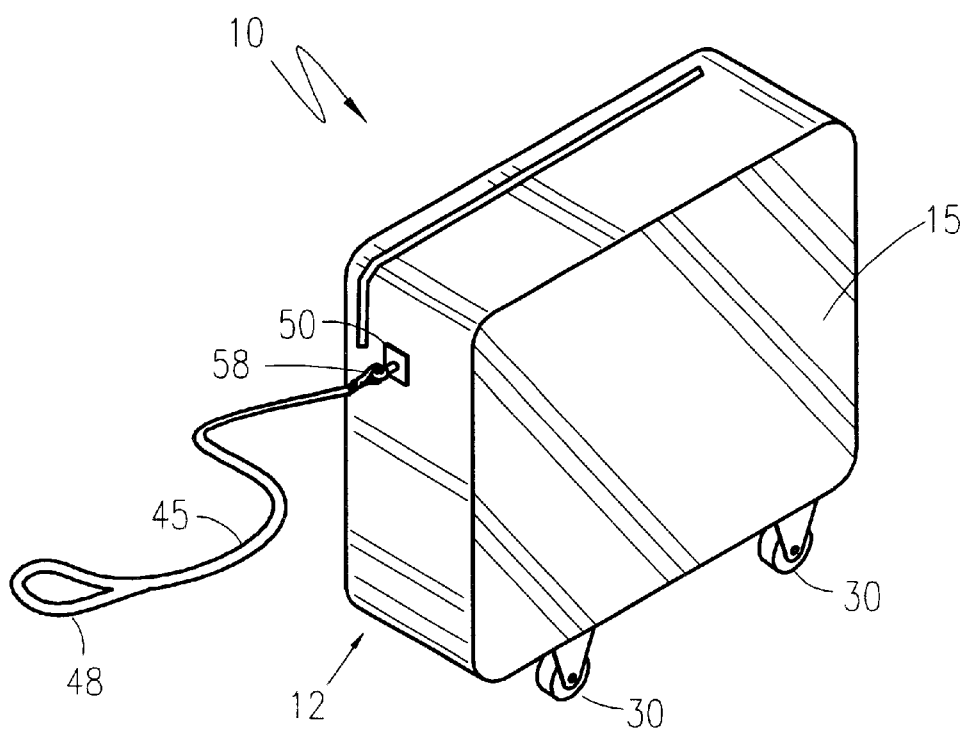
FIG. 1 is a perspective view of a removably attachable wheel assembly for article transporting containers according to the preferred embodiment of the present invention.

Referring now to FIGS. 1–11, a removably attachable wheel assembly for article transporting containers 10 is shown, according to the present invention, comprised of a plurality of permanently attachable mounting plates 20, a plurality of removably attachable wheel and axle assemblies 30, and a permanently attachable eye hook 50 for providing article transporting containers 12 such as luggage 15 and other objects not originally equipped with rolling wheels with a rolling means for easier travel. For purposes of disclosure, the article transporting container 12 is described and shown herein as a piece of luggage 12, but the present invention can be used with a variety of other article transporting containers 12 including suitcases and trash containers.

Figure 2:
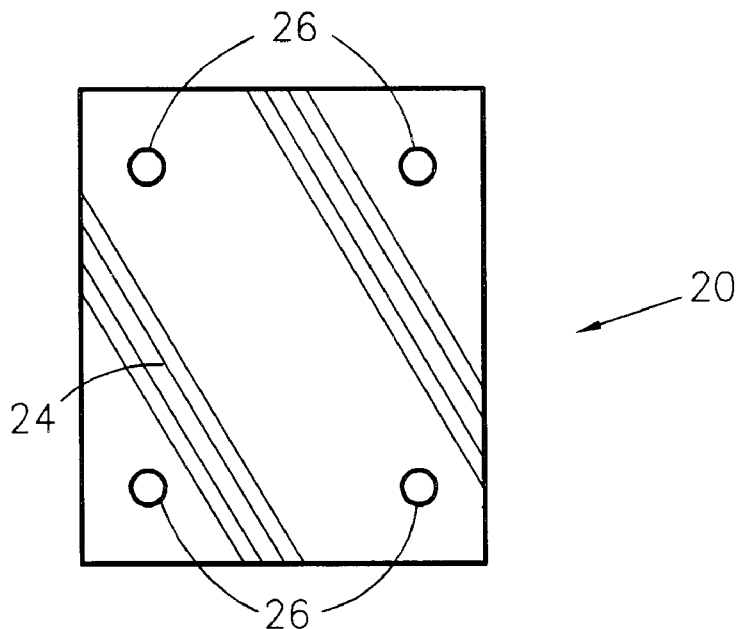
FIG. 2 is a bottom plan view of the mounting plate according to the preferred embodiment of the present invention.
Figure 3:
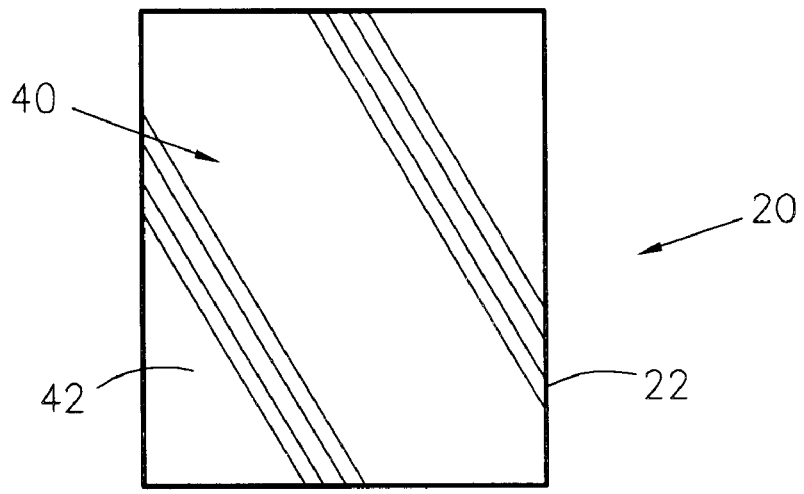
FIG. 3 is a top plan view thereof.
Figure 4:
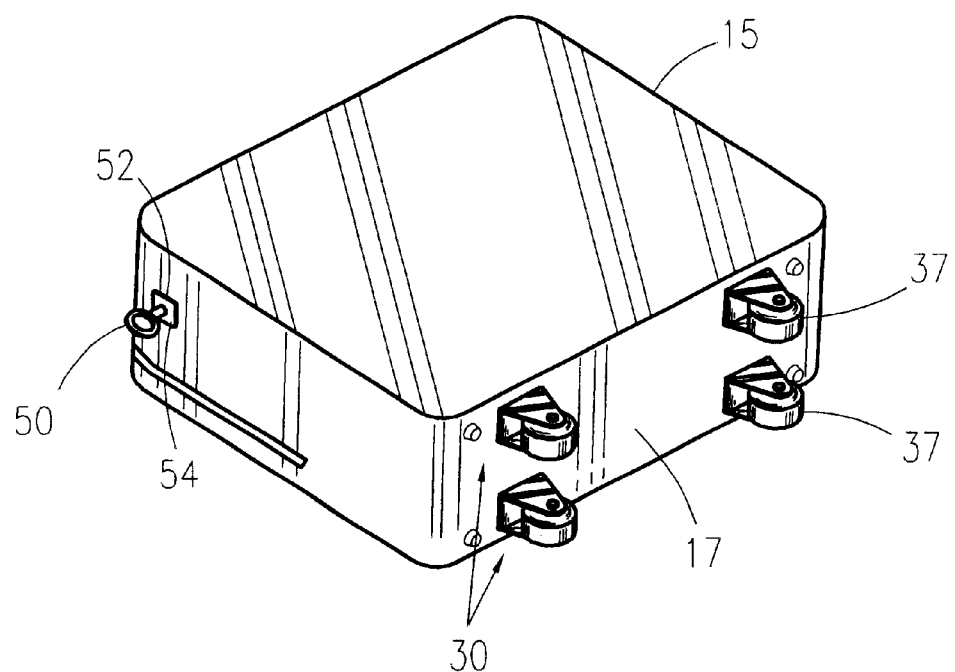
FIG. 4 is a bottom perspective view of the present invention according to the preferred embodiment shown without the pulling strap.
Figures 5, 6:
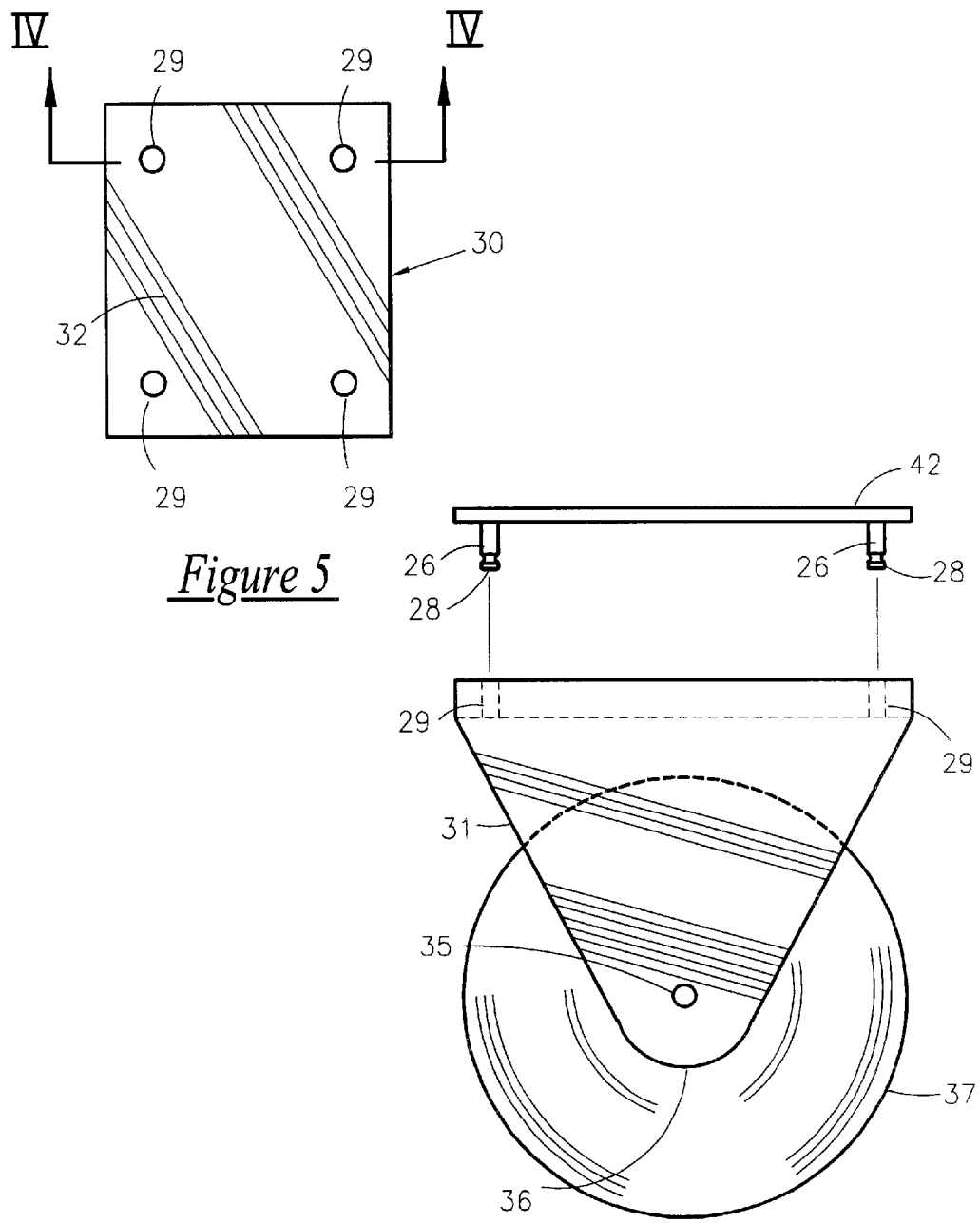
FIG. 5 is a top plan view of the wheel and axle assembly according to the preferred embodiment of the present invention.
FIG. 6 is an exploded perspective view of the removably attachable wheel assembly for article transporting containers according to the preferred embodiment.
Figure 7:
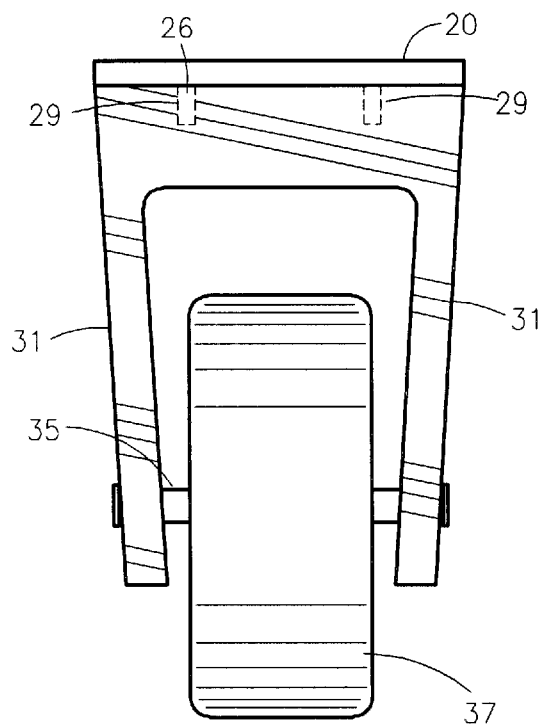
FIG. 7 is a rear elevational view of the wheel and axle assembly shown attached to the mounting plate.
Figure 8:
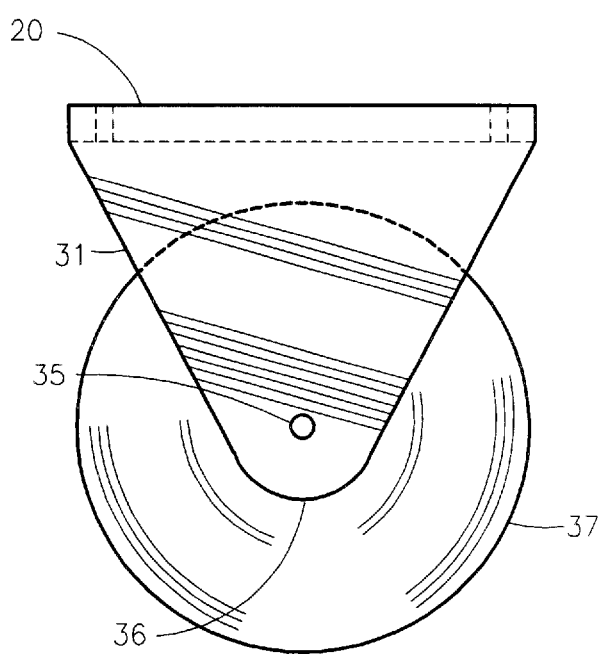
FIG. 8 is a side elevational view thereof.
Figure 9:
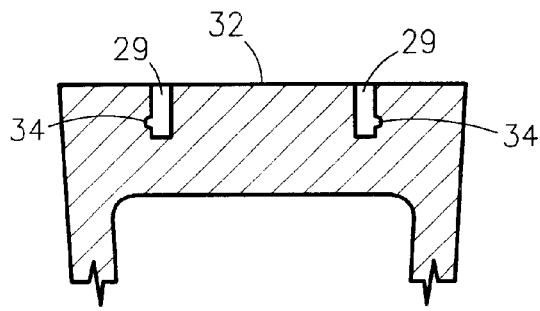
FIG. 9 is a cross-sectional view taken along lines IX—IX of FIG. 5.
Figure 10:
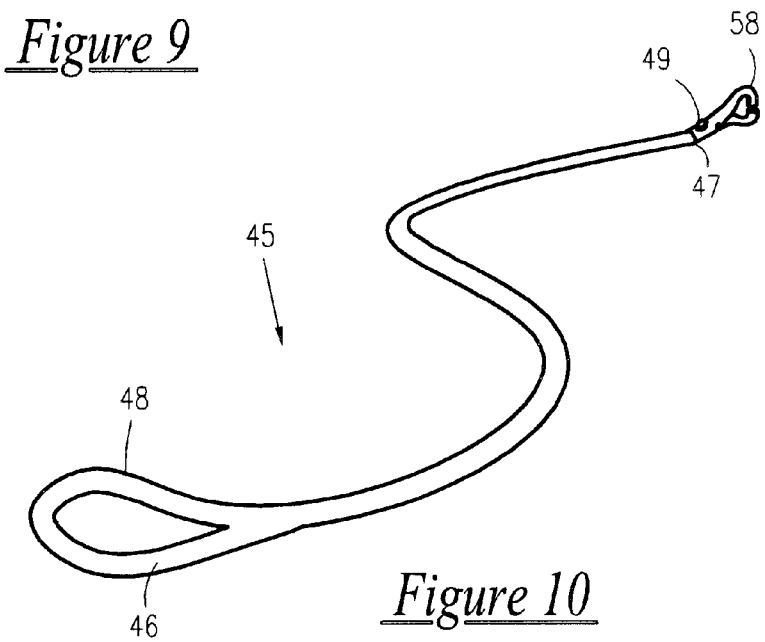
FIG. 10 is perspective view of the pulling strap according to the preferred embodiment of the present invention.
Figure 11:
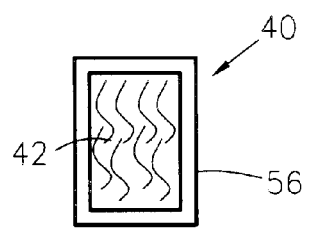
FIG. 11 is a bottom plan view of the base.

Referring now more specifically to FIGS. 2, 3, and 6, each of the plurality of mounting plates 20 has a top side 22 opposite a bottom side 24 and is of a flat, rectangular configuration constructed of a rigid, plastic material capable of injection molding, and therefore can be formed easily of recycled material.

Each mounting plate 20 is designed and configured so as to be permanently attached to a bottom surface 17 of the piece of luggage 15 or other article transporting container 12. The top side 22 of each mounting plate 20 has an attachment means 40 such as a layer of adhesive foam tape 42 adhered thereto, for permitting permanent attachment thereof to the bottom surface 17 of the luggage 15. It is envisioned that other suitable attachment means 40 such as glue may be utilized for permanently attaching the mounting plate 20 to the bottom surface 17 of the luggage 15; however, adhesive foam tape 42 is the preferred method for permanent attachment.

The bottom side 24 of each mounting plate 20 includes a plurality of wheel assembly receiving stems 26 mounted perpendicularly thereto at respective corners thereof. Each receiving stem 26 includes a spring-biased detent 28 located on a vertical sidewall thereof for being removably maintained within a corresponding tubular channel 29 provided in each of a plurality of wheel and axle assemblies 30.

Referring now to FIGS. 4 through 9, each wheel and axle assembly 30 is generally triangular-shaped in cross section formed by two V-shaped portions 31, each extending to an apex 36, and separated by a flat platform 32 positioned perpendicularly thereabove. Each wheel and axle assembly 30 includes a plurality of corresponding tubular channels 29 formed along the flat platform 32 wherein each tubular channel 29 is provided with a hole 34 formed therein for accommodating the detent 28 of each receiving stem 26, thereby affording positive locking of each receiving stem 26 within a corresponding tubular channel 29. Thus, as the receiving stems 26 of each mounting plate 20 are inserted within the corresponding tubular channels 29 of each wheel and axle assembly 30, the detents 28 bear against inside vertical walls of the respective tubular channels 29 until reaching the holes 34, at which point the detents 28 snap therein by the spring-biased force thereof, thereby lockably maintaining each wheel and axle assembly 30 into a respective mounting plate 20 until positively released. Each wheel and axle assembly 30 can be positively released by simply pulling each wheel and axle assembly 30 in a direction away from its corresponding mounting plate 20 with sufficient force as is necessary to remove the detent 28 from the hole 34.

Each wheel and axle assembly 30 includes wheels 37 rotatably mounted to an axle 35 which extends through the apex 36 thereof, parallel to the flat platform 32.

It is envisioned that numerous wheel and axle assemblies 30 with multiple sized wheels 34 would be available, wherein each such wheel and axle assembly 30 would be adapted so as to be lockably maintained to the bottom side 24 of each mounting plate 20, thereby facilitating universal attachment of wheel and axle assemblies 30 having multiple-sized wheels 37 to the same mounting plate 20. This feature facilitates easier transportation of an article transporting container 12 over all types of terrain. Being removably attachable, the wheel and axle assemblies 30 allow a user to maintain functionality of luggage 15 during periods when wheels 37 are not required and/or desired.

Referring now to FIGS. 1, 4, 10 and 11, in order for the luggage 15 to be easily drawn over ground, a pulling strap 45 is removably attached to an eye hook 50 which in turn, is permanently attached to an upper, lateral sidewall of the luggage 15. The eye hook 50 is mounted perpendicularly to a top side 54 of a flat, rectangular base 52. A bottom side 56 of the base 52 has an attachment means 40 such as adhesive foam tape 42 adhered thereto for permitting permanent attachment thereof to an upper, lateral sidewall of the luggage 15. The location for permanent attachment of the base 52 is meant only as a suggestion, and therefore can be attached at other more desired locations. Similar to the mounting plates 20, other suitable attachment means 40 such as glue may be utilized for permanently attaching the base 52 to the luggage 15; however, adhesive foam tape 42 is the preferred method for permanent attachment.

The pulling strap 45 is of a linearly, elongated configuration, preferably constructed of leather, having an anterior end 46 opposite a posterior end 47. The anterior end 46 is formed into a loop 48 for allowing the luggage 15 to be easily pulled by a hand of a user. The posterior end 47 includes a spring-biased hook 58 mounted thereto for being removably secured to the eye hook 50. The spring-biased hook 58 is biased to a closed position and includes a button 49 whereupon being depressed, actuates opening of the hook 58 so as to facilitate securement thereof to the eye hook 50 upon release of the button 49. In order to remove the hook 48 from the eye hook 50, the user simply presses the button 49, thereby biasing the hook 58 to an open position, and then simply removes the hook 58 from the eye hook 50.

2. Operation of the Preferred Embodiment

To use the present invention, the user permanently attaches each mounting plate 20 to the bottom surface 17 of a piece of luggage 15, via the adhesive foam tape 42 adhered to the top side of each mounting plate 20. Next, the user chooses the desired wheel and axle assemblies 30 having wheels 37 of a size to suit the load encountered, and simply snaps each wheel and axle assembly 30 onto a mounting plate 20 where it is firmly held thereto. Next, the user permanently attaches the base 52 of the eye hook 50 to an upper, lateral sidewall of the luggage 15, via the adhesive foam tape 42 adhered to the bottom side 56 of the base 52. The user then secures the spring-biased hook 48 of the pulling strap 45 to the eye hook 50 by depressing the button 49 located on the hook 48, thereby actuating the opening thereof, and thus facilitating securement of the hook 48 to the eye hook 50 upon release of the button 49.

In the event the user decides the wheel and axle assemblies 30 and pulling strap 45 are no longer needed, the user simply depresses the button 49 of the hook 48, and removes the pulling strap 45 from the eye hook 50. Next, the user simply pulls each wheel and axle assembly 30 in a direction away from its corresponding mounting plate 20 with sufficient force as is necessary to remove the detent 28 of each receiving stem 26 from the hole 34 of each tubular channel 29, thus positively releasing the wheel and axle assembly 50 from its mounting plate 20.

The use of the present invention provides luggage and other objects not originally equipped with rolling wheels the luxury of such a benefit in a manner which is quick, easy and effective.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A removably attachable wheel assembly for article transporting containers comprising:

a plurality of permanently attachable mounting plates, wherein each of the plurality of mounting plates has a top side opposite a bottom side and is of a flat, rectangular configuration constructed of a rigid material, a plurality of removably attachable wheel and axle assemblies, and a permanently attachable eye hook, wherein said article transporting container is adaptable to use with a variety of articles and said bottom side of each mounting plat includes a plurality of wheel assembly receiving stems mounted perpendicularly thereto at respective corners thereof, wherein each receiving stem includes a spring-biased detent located on a vertical sidewall thereof for being removably maintained within a corresponding tubular channel provided in each of a plurality of wheel and axle assemblies.

2. The removably attachable wheel assembly for article transporting containers of claim 1, wherein each wheel and axle assembly is generally triangular-shaped in cross section formed by two V-shaped portions, each extending to an apex, and separated by a flat platform positioned perpendicularly thereabove.

3. The removably attachable heel assembly for article transporting containers of claim 2, wherein each wheel and axle assembly includes a plurality of corresponding tubular channels formed along the flat platform wherein each tubular channel is provided with a hole formed therein for accommodating the detent of each receiving stem, thereby affording positive locking of each receiving stem within a co responding tubular channel, whereby as the receiving stems of each mounting plate are inserted within the corresponding tubular channels of each wheel and axle assembly, the detents bear against inside vertical walls of the respective tubular channels until reaching the holes, at which point the detents snap therein by the spring-biased force thereof, thereby lockably maintaining each wheel and axle assembly into a respective mounting plate until positively released.

4. A removably attachable wheel assembly for article transporting containers 1, wherein said rigid material is capable of injection molding.

5. The removably attachable wheel assembly for article transporting containers of claim 1, wherein each mounting plate is designed and configured so as to be permanently attached to a bottom surface a piece of luggage.

6. The removably attachable wheel assembly for article transporting containers of claim 1, wherein said top side of each mounting plate further comprises an attachment means adhered thereto, for permitting permanent attachment thereof to the bottom surface of an article to be transported.

7. The removably attachable wheel assembly for article transporting containers of claim 6, wherein said attachment means is selected from the group comprising adhesive foam tape, glue, and adhesive.

8. The removably attachable wheel assembly for article transporting containers of claim 1, further comprising a pulling strap removably attached to an eye hook which in turn, is permanently attached to an upper, lateral sidewall of an article to be transported.

9. The removably attachable wheel assembly for article transporting containers of claim 8, wherein said eye hook is mounted perpendicularly to a top side of a flat, rectangular base, said rectangular base having a bottom side supporting an attachment means.

10. The removably attachable wheel assembly for article transporting containers of claim 9, wherein said pulling strap is of a linearly, elongated configuration, having an anterior end6 opposite a posterior end, the anterior end formed into a loop and the posterior end includes a spring-biased hook mounted thereto for being removably secured to the eye hook.

* * * * *